United States Patent
Jain et al.

(10) Patent No.: US 10,193,862 B2
(45) Date of Patent: Jan. 29, 2019

(54) SECURITY POLICY ANALYSIS BASED ON DETECTING NEW NETWORK PORT CONNECTIONS

(71) Applicant: Nicira, Inc., Palo Alto, CA (US)

(72) Inventors: Jayant Jain, Palo Alto, CA (US);
Anirban Sengupta, Saratoga, CA (US);
Alok Tiagi, Palo Alto, CA (US);
Jingmin Zhou, Palo Alto, CA (US);
Russell Lu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 122 days.

(21) Appl. No.: 15/363,639

(22) Filed: Nov. 29, 2016

(65) Prior Publication Data
US 2018/0152417 A1    May 31, 2018

(51) Int. Cl.
*H04L 29/06*    (2006.01)
*G06F 9/455*    (2018.01)

(52) U.S. Cl.
CPC ...... *H04L 63/0263* (2013.01); *G06F 9/45558* (2013.01); *H04L 63/20* (2013.01);
(Continued)

(58) Field of Classification Search
CPC ............... G06F 2201/865; H04L 63/20; H04L 63/0227; H04L 63/10; H04L 63/0263;
(Continued)

(56) References Cited

U.S. PATENT DOCUMENTS 6,496,935 B1    12/2002    Fink et al.
6,880,089 B1    4/2005    Bommareddy et al.
(Continued)

FOREIGN PATENT DOCUMENTS

EP    2748750    7/2014
WO    2008/095010    8/2008
(Continued)

OTHER PUBLICATIONS

Author Unknown, "AppLogic Features", Jul. 2007, 2 pages, 3TERA, Inc.
(Continued)

*Primary Examiner* — Brian F Shaw
(74) *Attorney, Agent, or Firm* — Patterson & Sheridan, LLP (57) ABSTRACT

A computer system provides a method for identifying firewall rules to apply to a virtual machine based on detecting initiation of a new network connection from the virtual machine. An example method generally includes detecting initiation of communications on a network port by a virtual machine, identifying one or more applications executing on the virtual machine that initiated communications on the network port, identifying one or more firewall rules to apply to the virtual machine based, at least in part, on the identification of the one or more applications, determining a deviation between firewall rules applied to the virtual machine and the identified one or more firewall rules, and upon determining that a deviation exists between the firewall rules applied to the virtual machine and the identified one or more firewall rules, applying one or more rules corresponding to the determined deviation to the virtual machine.

20 Claims, 3 Drawing Sheets

(52) U.S. Cl.
CPC ............. *G06F 2009/45587* (2013.01); *G06F 2009/45595* (2013.01)

(58) Field of Classification Search
CPC ...... H04L 63/029; H04L 67/34; H04W 12/08; H04W 48/02
USPC .......................... 726/11; 718/1; 709/221, 22
See application file for complete search history.

(56) References Cited

U.S. PATENT DOCUMENTS

| | | | |
|---|---|---|---|
| 7,055,173 | B1 | 5/2006 | Chaganty et al. |
| 7,349,382 | B2 | 3/2008 | Marimuthu et al. |
| 7,818,452 | B2 | 10/2010 | Matthews et al. |
| 7,948,986 | B1 | 5/2011 | Ghosh et al. |
| 8,032,933 | B2 | 10/2011 | Turley et al. |
| 8,190,767 | B1 | 5/2012 | Maufer et al. |
| 8,352,391 | B1 | 1/2013 | Kapadia |
| 8,365,294 | B2 | 1/2013 | Ross |
| 8,660,129 | B1 | 2/2014 | Brendel et al. |
| 8,875,272 | B2 * | 10/2014 | Jansen ................ H04L 63/0281 713/152 |
| 9,015,823 | B2 | 4/2015 | Koponen et al. |
| 2002/0016826 | A1 | 2/2002 | Johansson et al. |
| 2002/0023089 | A1 | 2/2002 | Woo |
| 2003/0093481 | A1 | 5/2003 | Mitchell et al. |
| 2003/0123456 | A1 | 7/2003 | Denz et al. |
| 2004/0049701 | A1 | 3/2004 | Le Pennec et al. |
| 2005/0083937 | A1 | 4/2005 | Lim |
| 2005/0198125 | A1 | 9/2005 | Macleod Beck et al. |
| 2006/0075478 | A1 * | 4/2006 | Hyndman ........... H04L 63/0218 726/11 |
| 2006/0195896 | A1 | 8/2006 | Fulp et al. |
| 2007/0016946 | A1 | 1/2007 | Gouda et al. |
| 2007/0061492 | A1 | 3/2007 | van Riel |
| 2008/0072305 | A1 | 3/2008 | Casado et al. |
| 2008/0267177 | A1 | 10/2008 | Johnson et al. |
| 2008/0289028 | A1 | 11/2008 | Jansen et al. |
| 2008/0298274 | A1 | 12/2008 | Takashige et al. |
| 2009/0007251 | A1 | 1/2009 | Abzarian et al. |
| 2009/0129271 | A1 | 5/2009 | Ramankutty et al. |
| 2009/0150521 | A1 | 6/2009 | Tripathi |
| 2009/0235325 | A1 | 9/2009 | Dimitrakos et al. |
| 2009/0249470 | A1 | 10/2009 | Litvin et al. |
| 2009/0249472 | A1 | 10/2009 | Litvin et al. |
| 2009/0327781 | A1 | 12/2009 | Tripathi |
| 2010/0037311 | A1 | 2/2010 | He et al. |
| 2010/0100616 | A1 | 4/2010 | Bryson et al. |
| 2010/0115101 | A1 | 5/2010 | Lain et al. |
| 2010/0125667 | A1 | 5/2010 | Soundararajan |
| 2011/0016467 | A1 | 1/2011 | Kane |
| 2011/0022695 | A1 | 1/2011 | Dalal et al. |
| 2011/0072486 | A1 | 3/2011 | Hadar et al. |
| 2011/0103259 | A1 | 5/2011 | Aybay et al. |
| 2011/0113467 | A1 | 5/2011 | Agarwal et al. |
| 2011/0219444 | A1 | 9/2011 | Turley et al. |
| 2011/0246637 | A1 | 10/2011 | Murakami |
| 2012/0198541 | A1 | 8/2012 | Reeves |
| 2012/0240182 | A1 | 9/2012 | Narayanaswamy et al. |
| 2013/0007740 | A1 | 1/2013 | Kikuchi et al. |
| 2013/0019277 | A1 | 1/2013 | Chang et al. |
| 2013/0034106 | A1 | 2/2013 | Goyal et al. |
| 2013/0073743 | A1 | 3/2013 | Ramasamy et al. |
| 2013/0125120 | A1 | 5/2013 | Zhang et al. |
| 2013/0163594 | A1 | 6/2013 | Sharma et al. |
| 2013/0227097 | A1 | 8/2013 | Yasuda et al. |
| 2013/0227550 | A1 | 8/2013 | Weinstein et al. |
| 2013/0247034 | A1 | 9/2013 | Messerli |
| 2013/0332983 | A1 | 12/2013 | Koorevaar et al. |
| 2014/0068602 | A1 | 3/2014 | Gember et al. |
| 2014/0115578 | A1 | 4/2014 | Cooper et al. |
| 2014/0195666 | A1 | 7/2014 | Dumitriu et al. |
| 2014/0208412 | A1 | 7/2014 | Bray et al. |
| 2014/0281030 | A1 | 9/2014 | Cui et al. |
| 2014/0282854 | A1 | 9/2014 | Clark et al. |
| 2014/0282855 | A1 | 9/2014 | Clark et al. |
| 2015/0082417 | A1 | 3/2015 | Bhagwat et al. |
| 2015/0201047 | A1 | 7/2015 | Goyal et al. |
| 2015/0237013 | A1 | 8/2015 | Bansal et al. |
| 2015/0281178 | A1 | 10/2015 | Raman et al. |
| 2015/0281180 | A1 | 10/2015 | Raman et al. |
| 2015/0358288 | A1 | 12/2015 | Jain et al. |
| 2016/0323245 | A1 | 11/2016 | Shieh et al. |

FOREIGN PATENT DOCUMENTS

| | | |
|---|---|---|
| WO | 2013/074828 | 5/2013 |
| WO | 2013/168053 | 11/2013 |

OTHER PUBLICATIONS

Author Unknown, CISCO Identity-Based Firewall Security,: Month Unknown, 2011, 2 pages, CISCO Systems, Inc.
Author Unknown, "Enabling Service Chaining on Cisco Nexus 1000V Series," Month Unknown, 2012, 25 pages, CISCO.
Author Unknown, "Next-Generation Firewalls," Month Unknown, 2013, 1 page, Palo Alto Networks.
Basak, Debashis, et al.,"Virtualizing Networking and Security in the Cloud," Month Unknown, 2010, 9 pages, vmware.com.
Casado, Martin, et al., SANE: A Protection Architecture for Enterprise Networks, Proceedings of the 15th USENIX Security Symposium, Jul. 31, 2006, 15 pages.
Dixon, Colin, et al., "An End to the Middle," Proceedings of the 12th conference on Hot topics in operating systems USENIX Association, May 2009, pp. 1-5, Berkeley, CA, USA.
Dumitriu, Dan Mihai, et al. (U.S. Appl. No. 61/514,990), filed Aug. 4, 2011.
Guichard, J., et al., "Network Service Chaining Problem Statement; draft-quinn-nsc-problem-statement-00.txt," Jun. 13, 2013, pp. 1-14, Cisco Systems, Inc.
Ioannidis, Sotiris, et al., "Implementing a Distributed Firewall," CCS'00, Month Unknown, 2000, 10 pages, ACM, Athens, Greece.
Joseph, Dilip Antony, et al., "A Policy-aware Switching Layer for Date Centers," Jun. 24, 2008, 26 pages, Electrical Engineering and Computer Sciences, University of California, Berkeley, CA, USA.
Neji, Nizar Ben, et al., "Towards Safe and Optimal Filtering Rule Reordering for Complex Packet Filters," 2011 5th International Conference on Network and System Security (NSS), Sep. 6, 2011, pp. 153-160, IEEE, Milan, Ialy.
Scarfone, Karen, et al., "Guidelines on Firewalls and Firewall Policy," Sep. 2009, 48 pages, NIST, U.S. Department of Commerce.
Sekar, Vyas, et al., "Design and Implementation of a Consolidated Middlebox Architecture," in Proc. of NSDI, Month Unknown, 2012, 14 pages.
Sherry, Justine, et al., "Making Middleboxes Someone Else's Problem: Network Processing as a Cloud Service," In Proc. of SIGCOMM, Aug. 13-17, 2012, 12 pages, Helskinki, Finland.
Stojanovski, Nenad, et al., "Architecture of a Identity Based Firewall System," Jul. 2011, 9 pages.
Stojanovski, Nenad, et al., "Analysis of Identity Based Firewall Systems," Jun. 2010, 9 pages.
International Search Report and Written Opinion, PCT/US2015/027632, dated Jul. 16, 2015.

* cited by examiner

SECURITY POLICY ANALYSIS BASED ON DETECTING NEW NETWORK PORT CONNECTIONS

BACKGROUND

In a logical network, multiple virtual computing instances (e.g., virtual machines (VMs), containers (e.g., Docker containers), data compute nodes, isolated user space instances, etc.) may be instantiated on one or more physical computing devices. Each virtual computing instance may execute one or more applications. The lifecycle of these virtual computing instances may be dynamic. For example, as needed by users of the logical network, a management server in the logical network can dynamically generate or deallocate virtual computing instances.

In certain aspects, each virtual computing instance running on a physical computing device (e.g., a host device) may be implemented by a hypervisor running on that host device. The hypervisor may further implement a firewall (e.g., in a logical switch) that implements security rules that define, for example, network destinations that applications executing in the virtual computing instance are allowed to communicate with, network destinations that are blocked from communicating with the virtual machine, and so on. Often, multiple security policies may exist and be applied to the virtual computing instances. For example, different security policies may apply to different virtual computing instances or different applications executing on the virtual computing instances. These security policies may be enforced as rules generated by a system administrator and applied to the appropriate virtual computing instances by the firewall.

Further, as new applications are introduced into the computing environment deployed for execution on virtual computing instances, or as new features are enabled in already deployed applications, additional security policies may be added to the computing environment to protect the new applications and/or application features. Because of the variations in the applications deployed in the computing environment and the policies applicable to each deployed application, a system administrator may not be able to predict the policies that are applied to different virtual machine instances.

SUMMARY

One or more embodiments implement a method for identifying firewall rules to apply to a virtual machine based on detecting initiation of a new network connection from the virtual machine. The method includes detecting initiation of communications on a network port by a virtual machine, identifying one or more applications executing on the virtual machine that initiated communications on the network port, identifying one or more firewall rules to apply to the virtual machine based, at least in part, on the identification of the one or more applications, determining a deviation between firewall rules applied to the virtual machine and the identified one or more firewall rules, and upon determining that a deviation exists between the firewall rules applied to the virtual machine and the identified one or more firewall rules, applying one or more rules corresponding to the determined deviation to the virtual machine.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
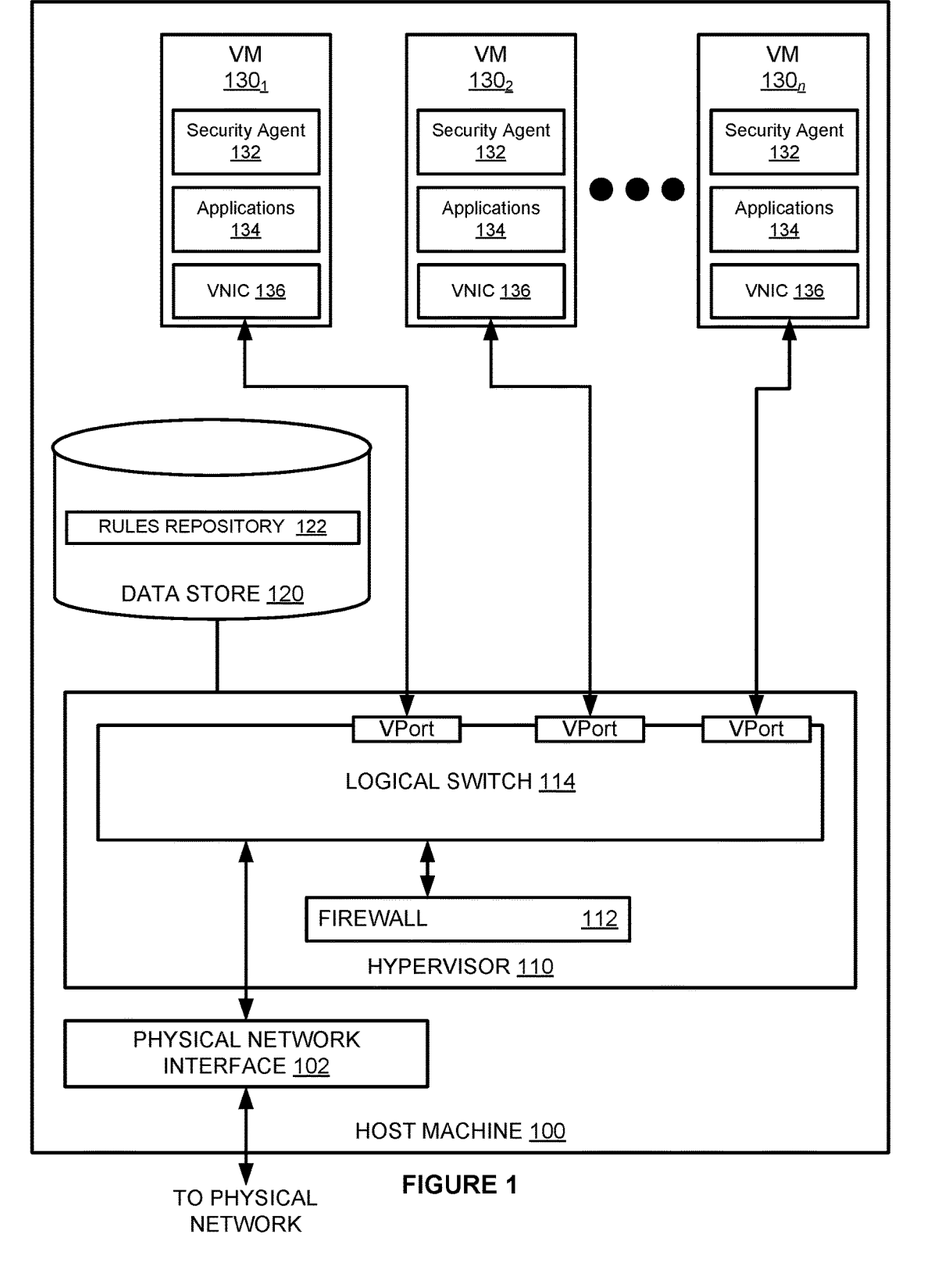
FIG. 1 is a block diagram of a host machine in which a firewall applies security policies to a virtual machine upon detecting the opening of a port during runtime, according to some embodiments.

FIG. 1 illustrates an example host machine 100, according to some embodiments. As illustrated, host machine 100 includes a physical network interface 102, a hypervisor 110, a data store 120, and a plurality of virtual machines 130. Host machine 100 may provide part of the computing infrastructure in a virtualized computing environment distributed among multiple host machines. Though certain embodiments are described herein with respect to VMs, the same principals and techniques may also apply to other appropriate virtual computing instances. As shown, hypervisor 110, data store 120, and the plurality of virtual machines reside on host machine 100. In certain embodiments, host machine 100 is a hardware computing platform (e.g., a server) or a cluster of hardware computing platforms. Each hardware computing platform includes one or more central processing units (CPUs), system memory, storage, and one or more network interfaces for communicating with other hardware computing platforms within host machine 100 and/or network destinations outside of host machine 100.

Host machine 100, as illustrated, has access to a physical network through physical network interface 102. Hypervisor 110, which, as illustrated includes a firewall 112 and a logical switch 114, serves as an interface between the hosted virtual machines 130 and physical network interface 102, as well as other physical resources available on host machine 100. Each of the virtual machines 130 includes a virtual network interface card (VNIC) 136, which is responsible for exchanging packets between the virtual machine 130 and hypervisor 110. VNICs 136 may be, in some cases, a software abstraction of a physical network interface card implemented by an emulator and may include a firewall filter for identifying relevant firewall rules and applying the relevant firewall rules for filtering packets. Each virtual machine 130 is connected to a virtual port provided by logical switch 114, and the virtual switch is connected to physical network 102 to allow network traffic to be exchanged between virtual machines 130 executing on host machine 100 and external network destinations. While hypervisor 110 is illustrated as including logical switch 114, it should be recognized that hypervisor 110 may additionally expose virtual ports to one or more virtual machines 130 using a logical router or other logical networking infrastructure provided by hypervisor 110.

Firewall 112 operates in a kernel space of the hypervisor 110 and monitors logical ports provided by infrastructure components (e.g., logical switch ports, logical router ports, and so on) in host machine 100 for the establishment of new connections between a virtual machine 130 and a logical port. In alternate embodiments, firewall 112, along with virtual switch and physical device drivers, may execute in a privileged virtual machine. The privileged virtual machine may be referred to variously as a "Domain zero," "root-partition," or "parent-partition."

Each virtual machine 130 may exist in a user space of a hypervisor, including hypervisor 110, or another hypervisor installed on a different physical device than hypervisor 110. Multiple virtual machines 130 may exist on a single hypervisor. Virtual machines 130 may host one or more applications 134 which may be used by one or more users to generate network traffic and transmit the network traffic to destinations inside or outside the computing environment that host machine 100 is a member of. The virtual machines 130 communicate with each other and destinations outside of the computing environment via connections provided by the infrastructure components. When virtual machines 130 are deployed, they may be deployed from a template that is specified in their respective configuration files.

As illustrated, virtual machines 130 include a security agent 132 executing on the virtual machine. Security agent 132 may be a thin client application or daemon that is instantiated at runtime (e.g., when a virtual machine 130 is booted up). In response to queries generated by firewall 112, security agent 132 provides information about applications executing on a virtual machine, as discussed herein.

In a computing environment (e.g., a datacenter, logical network, etc.), large numbers of virtual machines may execute, and each virtual machine may execute a unique set of applications and have a unique set of rules applied by firewall 112 to protect the virtual machine. Because the lifecycle of these virtual machines is dynamic (e.g., virtual machines can be booted and halted on an as-needed basis), the virtual machines execute with different postures, and a network administrator may not control all open ports and services at all times, a network administrator may not be able to manually determine which services are executing and which ports are open at any given time. According to embodiments, when firewall 112 detects that a virtual machine 130 has opened a new connection on a logical port provided by host machine 100, firewall 112 can assume that a new application has been started up or a new feature in an existing application has been deployed on the virtual machine 130. In response, firewall 112 requests, from the virtual machine 130, information about the applications executing on virtual machine 130. The information may be received from virtual machine 130, for example, as a list of application package names, application name and version information, and so on. Firewall 112 obtains the information by querying the security agent 132 on virtual machine 130 that allows for components in host machine 100 to perform introspection into the operations performed on virtual machine 130.

Firewall 112 uses the information about applications executing on virtual machine 130 to identify rules to apply to virtual machine 130 to control traffic between virtual machine 130 and network destinations within and outside of a computing environment that host machine 100 is a member of. In some cases, the rules can identify a set of applications that are allowed to execute on the virtual machine and blacklisted and whitelisted network destinations for the applications that are allowed to execute on the virtual machine. In other cases, the rules identify whitelisted and blacklisted network destinations on a per-application basis or based on a classification of an application (e.g., web servers, database servers, and so on). Whitelisted network destinations may include a list of ports and internet protocol (IP) addresses for which traffic is allowed, and blacklisted network destinations may include a list of ports and IP addresses for which traffic is blocked. In some cases, the rules applied to the applications executing on virtual machine 130 can identify ranges of IP addresses that are allowed or blocked as a netmask identifying a subnet for which a particular rule applies or an upper bound and lower bound of IP addresses for a particular rule.

In some cases, firewall 112 can identify the rules to apply to virtual machine 130 based on operational policies associated with a type of the virtual machine (e.g., a virtual machine configuration defining the functionality of and the applications executing on a virtual machine). The operational policies can identify, for example, a list of applications that are allowed to execute on the virtual machine and destinations with which each application can communicate. For example, operational policies for applications that execute in a demilitarized zone (DMZ) may allow such applications to communicate with destinations outside of a computing environment that host machine is a member of 100 but may restrict access to other virtual machines or services operating within the computing environment that are not executing in the DMZ. Applications that execute outside of a DMZ may be associated with policies that allow communications within the computing environment but block communications outside of the computing environment (e.g., to and from external network destinations).

Firewall 112 examines the firewall rules currently applied to the virtual machine 130 against the identified set of firewall rules to determine if the implemented firewall rules satisfy the security requirements defined for the applications executing on virtual machine 130. If firewall 112 determines that the rules currently applied to the virtual machine comply with the rules defined in a policy for the virtual machine, firewall 112 determines that no further action need be taken to secure the virtual machine.

Otherwise, firewall 112 determines that a mismatch exists between the rules applied to the virtual machine and the rules that should be applied to the virtual machine as identified in the operational policy associated with the virtual machine. When firewall 112 determines that a mismatch exists, firewall 112 can determine a delta between the applied rules and the rules defined in the operational policy. The delta may include both rules that are applied on the virtual machine and not specified by the policy associated with the virtual machine and rules that are specified in the policy but are not applied to the virtual machine.

Based on the identified delta between rules applied to the virtual machine and rules defined in a policy for the virtual machine, firewall 112 can identify one or more rules to apply to the virtual machine 130 to bring the virtual machine into compliance with the defined policy. In some cases, firewall 112 can automatically apply the identified rules to bring the virtual machine into compliance with the rules defined in a policy for the virtual machine (e.g., blocking communications with machines outside of a defined subnet, allowing communications on the virtual network port within a defined subnet, and so on).

In some cases, firewall 112 can generate and send a report to a system administrator including information about the determined delta between the applied rules and the rules defined in a policy. The report can be generated, for example, as a message displayed in a management console for a computing environment that the host machine 100 is a member of, an e-mail message, an SMS message, or other messages. Based on the message, a system administrator can log into a management server to take one or more actions to rectify the delta between the applied rules and the rules defined in the policy for the virtual machine. Using an interface provided by the management server, the system administrator can confirm a suggested modification to the rules applied to the virtual machine.

In some cases, the system administrator can view information about the newly launched application, such as the name of the application, destination IP addresses for traffic generated by the application, source IP addresses for network traffic received by the application, and so on. If a system administrator determines that the application should not execute on the virtual machine, the system administrator can take one or more actions to terminate execution of the application. For example, a system administrator can terminate the virtual machine 130 and bring a new virtual machine online based on a template associated with the type of services provided by the virtual machine (e.g., a web server, a database server, a distributed data processing service, and so on). In some cases, the system administrator can instruct security agent 132 at the virtual machine 130 to terminate the process that caused the mismatch between the rules applied to the virtual machine and the rules defined in a policy associated with the virtual machine.

Rules and policies to apply to virtual machines executing on host machine 100 (and other host machines in a distributed computing environment) may be stored in data store 120. Data store 120 is a persistent data store (e.g., a database) and includes a rules repository 122 to store rules as discussed herein. As new versions of existing applications are added to a computing environment that host machine 100 is a member of, existing rules can be edited to cover the updated applications. When new applications are added to a computing environment that host machine 100 is a member of (e.g., to complement or replace existing applications executing in the computing environment), new rules can be added to rules repository 122 for the new application.

In some cases, the policies that are applied to virtual machines 130 in the computing environment may be made available to a management server external to host machine 100. The management server generally connects to firewall 112 to apply rules to a virtual machine 130 based on a determination that a deviation exists between the applied rules and the rules defined in a policy for the virtual machine, as discussed herein. In some embodiments, the management server can connect to the security agents 132 in each virtual machine 130 to obtain information about the applications executing on a virtual machine and, instead of firewall 112 as discussed herein, identify a difference between rules applied to the virtual machines 130 and rules that should be applied to the virtual machines 130. Based on the identified difference, the management server can instruct firewall 112 to apply one or more rules to the virtual machines 130, as discussed above.

Figure 2:
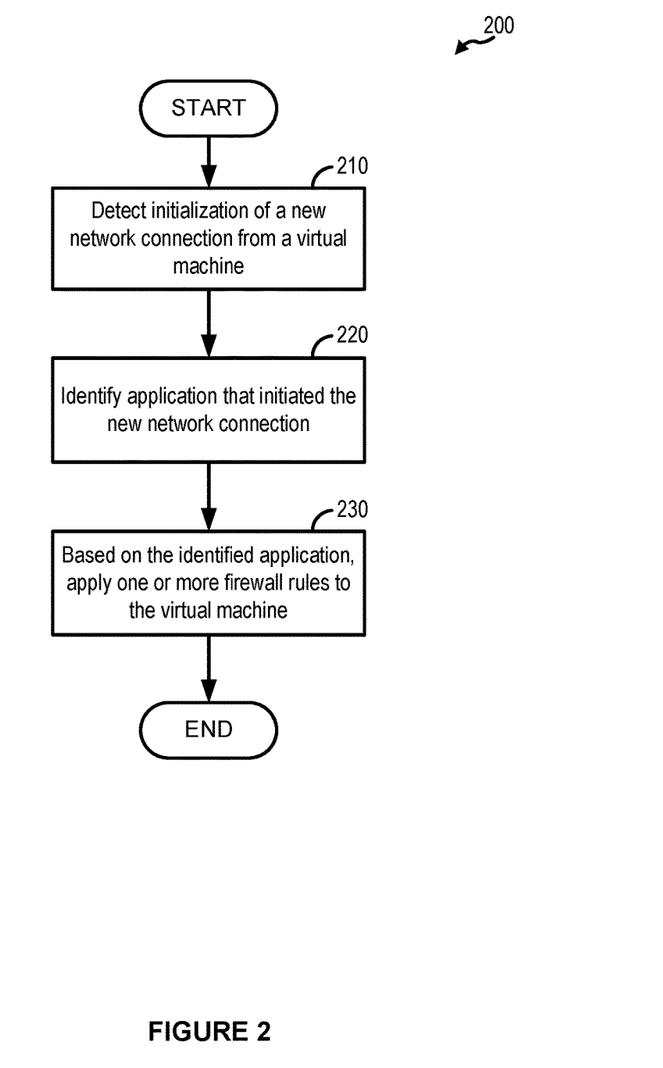
FIG. 2 illustrates example operations that may be performed by a firewall to apply security policies to a virtual machine based on detecting the opening of a port during runtime, according to some embodiments.

FIG. 2 illustrates a flow diagram of method 200 for identifying rules to apply to a virtual machine based on detecting a new connection from the virtual machine to a logical port in network infrastructure, according to one embodiment. As illustrated, method 200 begins at step 210, where a firewall detects the initialization of a new network connection from a virtual machine. The new network connection may be, for example, a new connection from a virtual machine to a logical switch port or a logical router port provided by network infrastructure in the computing environment. Firewall 112 can use detecting initialization of new network connections from a virtual machine as a proxy for detecting that a new application has been deployed and launched on the virtual machine.

At step 220, firewall 112 identifies the application that initiated the new network connection. To identify the application that initiated the new network connection, firewall 112 transmits a request to security agent 132 for a list of applications executing on the virtual machine 130. Firewall 112 compares the list of applications received from security agent 132 to a previously generated list of applications executing on the virtual machine to identify the application (or applications) that initiated the new network connection. In some cases, the list of applications may be based on a default template that defines the type of services executing on the virtual machine.

At step 230, firewall 112 applies one or more firewall rules to the virtual machine based on the identified application. When firewall 112 identifies the application that initiated the new network connection, firewall 112 can query a rules repository for one or more firewall rules to apply to the new application to eliminate or minimize attack vectors that could compromise the virtual machine. The rules may include data identifying sets of IP addresses for which network traffic is allowed and sets of IP addresses for which network traffic is blocked. In some cases, firewall 112 can obtain rules from a rules repository based on the role of the virtual machine in the distributed computing environment and apply the rules to communications on the newly opened connection.

Figure 3:
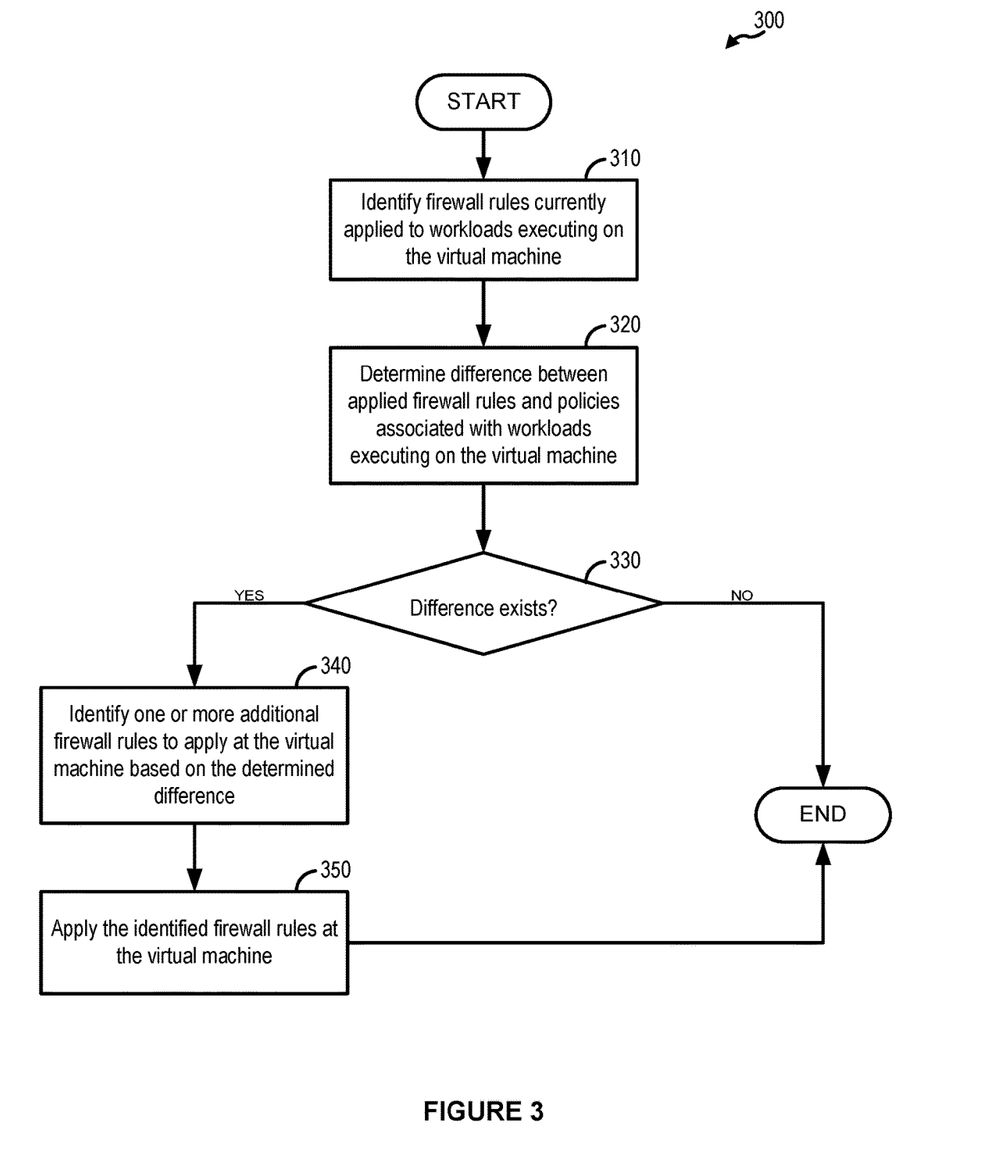
FIG. 3 illustrates example operations that may be performed by a firewall to identify differences in applied firewall rules for workloads executing on a virtual machine and firewall rules to be applied for the workloads, according to some embodiments.

FIG. 3 illustrates a flow diagram of method 300 for identifying rules to apply to a virtual machine (e.g., in response to determining that an application has launched on a virtual machine and opened a connection with a logical port provided by network infrastructure in hypervisor 110 executing on host machine 100), according to one embodiment. As illustrated, firewall 112 identifies rules to apply to a virtual machine based on a deviation between rules applied to a virtual machine and rules that should be applied to a virtual machine.

Method 300 starts at step 310, where firewall 112 identifies the firewall rules that are currently applied to applications executing on the virtual machine. Firewall 112 can identify the rules currently applied to the virtual machine, for example, on a per-connection basis (e.g., for each logical port through which a virtual machine communicates with other virtual machines in a computing environment that host machine 100 is a member of and network destinations outside of the computing environment).

At step 320, firewall 112 determines a difference between the applied firewall rules and rules that should be applied to the virtual machine. The rules that should be applied to the virtual machine may be identified, for example, by a policy associated with the applications executing on the virtual machine. Firewall 112 can determine the rules that should be applied to the virtual machine, for example, based on policies that define rules based the applications executing on the virtual machine and the posture of the virtual machine (e.g., whether the virtual machine is located inside or out of a demilitarized zone).

At step 330, firewall 112 identifies whether or not a difference exists between the applied firewall rules and the rules that should be applied to the virtual machine. If the answer to step 330 is NO, method 300 ends.

Otherwise, method 300 proceeds to step 340, where the firewall identifies one or more additional firewall rules to apply at the virtual machine based on the determined difference. In some cases, firewall 112 can identify the rules to apply to the virtual machine on a per-port basis. For each port to which the virtual machine is connected, firewall 112 can compare the rules currently applied to communications on that port to the rules that should be applied to the port (e.g., as defined in a policy associated with the posture or applications executing on the virtual machine).

At step 350, firewall 112 applies the identified rules to the virtual machine. In some cases, firewall 112 can automatically apply the identified rules to the virtual machine to protect the virtual machine from threats or attack vectors without intervention from a system administrator. In some cases, firewall 112 can generate an alert to be displayed to a system administrator. The alert can include a list of rules to apply to the virtual machine and allow a system administrator to confirm application of the rules to the virtual machine. Upon receiving a response from the system administrator confirming that rules can be applied, firewall 112 applies the rules to the virtual machine.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method comprising:
detecting, at a firewall outside of a virtual computing instance, opening of a new connection on a network port by the virtual computing instance;
requesting, by the firewall from the virtual computing instance, information indicative of one or more applications executing on the virtual computing instance that opened the new connection on the network port in response to the detecting of the opening of the new connection on the network port;
receiving, by the firewall from the virtual computing instance, the information indicative of the one or more applications in response to requesting the information;
identifying the one or more applications based on the information indicative of the one or more applications;
identifying one or more firewall rules to apply to the virtual computing instance based, at least in part, on the identification of the one or more applications;
determining a deviation between firewall rules applied to the virtual computing instance and the identified one or more firewall rules; and
upon determining that a deviation exists between the firewall rules applied to the virtual computing instance and the identified one or more firewall rules, applying one or more rules corresponding to the determined deviation to the virtual computing instance.

2. The method of claim 1, wherein the information indicative of the one or more applications comprises application deployment information of the virtual computing instance, and wherein identifying the one or more applications comprises:

determining a difference between a known list of applications deployed on the virtual computing instance and the received application deployment information.

3. The method of claim 1, wherein identifying the one or more firewall rules to apply to the virtual computing instance is further based on a posture of the virtual computing instance.

4. The method of claim 3, wherein the posture indicates whether the virtual computing instance is accessible to machines outside of a computing environment in which the virtual computing instance is located.

5. The method of claim 1, wherein identifying the one or more firewall rules to apply to the virtual computing instance is further based on rules associated with a type of service provided by the virtual computing instance.

6. The method of claim 1, wherein the rules identify a range of internet protocol (IP) addresses for which communications are allowed.

7. The method of claim 1, wherein the rules identify a subnetwork that the virtual computing instance is allowed to communicate with.

8. A non-transitory computer readable medium comprising instructions to be executed in a computer system to cause the computer system to carry out a method for context-based packet scanning in a computing environment, said method comprising:
    detecting, at a firewall outside of a virtual computing instance, opening of a new connection on a network port by the virtual computing instance;
    requesting, by the firewall from the virtual computing instance, information indicative of one or more applications executing on the virtual computing instance that opened the new connection on the network port in response to the detecting of the opening of the new connection on the network port;
    receiving, by the firewall from the virtual computing instance, the information indicative of the one or more applications in response to requesting the information;
    identifying the one or more applications based on the information indicative of the one or more applications;
    identifying one or more firewall rules to apply to the virtual computing instance based, at least in part, on the identification of the one or more applications;
    determining a deviation between firewall rules applied to the virtual computing instance and the identified one or more firewall rules; and
    upon determining that a deviation exists between the firewall rules applied to the virtual computing instance and the identified one or more firewall rules, applying one or more rules corresponding to the determined deviation to the virtual computing instance.

9. The non-transitory computer readable medium of claim 8, wherein the information indicative of the one or more applications comprises application deployment information of the virtual computing instance, and wherein identifying the one or more applications comprises:
    determining a difference between a known list of applications deployed on the virtual computing instance and the received application deployment information.

10. The non-transitory computer-readable medium of claim 8, wherein identifying the one or more firewall rules to apply to the virtual computing instance is further based on a posture of the virtual computing instance.

11. The non-transitory computer-readable medium of claim 8, wherein identifying the one or more firewall rules to apply to the virtual computing instance is further based on rules associated with a type of service provided by the virtual computing instance.

12. The non-transitory computer-readable medium of claim 8, wherein the rules identify a range of internet protocol (IP) addresses for which communications are allowed.

13. The non-transitory computer-readable medium of claim 8, wherein the rules identify a subnetwork that the virtual computing instance is allowed to communicate with.

14. A computer system comprising:
    a plurality of hosts, each having one or more virtual computing instances deployed thereon; and
    a network hypervisor configured to carry out a method for identifying rules to apply to a virtual computing instance by:
        detecting, at a firewall outside of the virtual computing instance, opening of a new connection on a network port by the virtual computing instance;
        requesting, by the firewall from the virtual computing instance, information indicative of one or more applications executing on the virtual computing instance that opened the new connection on the network port in response to the detecting of the opening of the new connection on the network port;
        receiving, by the firewall from the virtual computing instance, the information indicative of the one or more applications in response to requesting the information;
        identifying the one or more applications based on the information indicative of the one or more applications;
        identifying one or more firewall rules to apply to the virtual computing instance based, at least in part, on the identification of the one or more applications;
        determining a deviation between firewall rules applied to the virtual computing instance and the identified one or more firewall rules; and
        upon determining that a deviation exists between the firewall rules applied to the virtual computing instance and the identified one or more firewall rules, applying one or more rules corresponding to the determined deviation to the virtual computing instance.

15. The computer system of claim 14, wherein the information indicative of the one or more applications comprises application deployment information of the virtual computing instance, and wherein identifying the one or more applications comprises:
    determining a difference between a known list of applications deployed on the virtual computing instance and the received application deployment information.

16. The computer system of claim 14, wherein identifying the one or more firewall rules to apply to the virtual computing instance is further based on a posture of the virtual computing instance.

17. The computer system of claim 16, wherein the posture indicates whether the virtual computing instance is accessible to machines outside of a computing environment in which the virtual computing instance is located.

18. The computer system of claim 14, wherein identifying the one or more firewall rules to apply to the virtual computing instance is further based on rules associated with a type of service provided by the virtual computing instance.

19. The computer system of claim 14, wherein the rules identify a range of internet protocol (IP) addresses for which communications are allowed.

20. The computer system of claim 14, wherein the rules identify a subnetwork that the virtual computing instance is allowed to communicate with.

* * * * *